US009149931B2

(12) United States Patent
Kamiya

(10) Patent No.: US 9,149,931 B2
(45) Date of Patent: Oct. 6, 2015

(54) ROBOT SYSTEM, ROBOT CONTROL DEVICE AND METHOD FOR CONTROLLING ROBOT

(71) Applicant: KABUSHIKI KAISHA YASKAWA DENKI, Kitakyushu-shi (JP)

(72) Inventor: Yosuke Kamiya, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/203,570

(22) Filed: Mar. 11, 2014

(65) Prior Publication Data
US 2014/0195054 A1 Jul. 10, 2014

Related U.S. Application Data

(63) Continuation of application No. PCT/JP2011/071137, filed on Sep. 15, 2011.

(51) Int. Cl.
*G06F 19/00* (2011.01)
*B25J 9/16* (2006.01)
*B25J 13/06* (2006.01)

(52) U.S. Cl.
CPC ............... *B25J 9/1643* (2013.01); *B25J 13/06* (2013.01); *G05B 2219/40367* (2013.01); *G05B 2219/40381* (2013.01)

(58) Field of Classification Search
CPC .................... B25J 13/06; B25J 9/1643; G05B 2219/40381
See application file for complete search history.

(56) References Cited

U.S. PATENT DOCUMENTS 5,781,705 A 7/1998 Endo
2007/0146371 A1 6/2007 Dariush
(Continued)

FOREIGN PATENT DOCUMENTS

JP 05-096477 4/1993
JP 05-228864 9/1993
(Continued)

OTHER PUBLICATIONS

Arai, "Motion Planning of Discrete-time Nonholonomic Systems with Difference-Equation Constraints", Journal of the Robotics Society of Japan, Sep. 15, 2000, pp. 65 to 72, vol. 18, No. 6.
(Continued)

*Primary Examiner* — Bhavesh V Amin
(74) *Attorney, Agent, or Firm* — Mori & Ward, LLP

(57) ABSTRACT

A robot system includes a robot and a robot control device. The robot has a plurality of joint axes including a redundant axis. The robot control device includes a first command generator, a limit avoidance command generator, a posture optimization command generator, a null space matrix calculator, a second command generator and a controller. The first command generator generates a first joint angular speed command for the robot. The limit avoidance command generator generates a joint angular speed command A for the robot for avoiding a state in which the robot reaches an operating limit. The posture optimization command generator generates a joint angular speed command B for the robot for optimizing a posture of the robot. The null space matrix calculator calculates a null space matrix of a Jacobian matrix related to a control point. The second command generator generates a second joint angular speed command for the robot.

16 Claims, 10 Drawing Sheets

(56) References Cited

U.S. PATENT DOCUMENTS

2007/0162164 A1 7/2007 Dariush
2008/0243307 A1 10/2008 Toussaint et al.

FOREIGN PATENT DOCUMENTS

| JP | 06-187020 | 7/1994 |
|---|---|---|
| JP | 08-52674 | 2/1996 |
| JP | 09-109072 | 4/1997 |
| JP | 2003-103482 | 4/2003 |
| JP | 2004-094399 | 3/2004 |
| JP | 2008-238396 | 10/2008 |
| JP | 2009-521751 | 6/2009 |
| JP | 2010-082774 | 4/2010 |
| JP | 2010-120124 | 6/2010 |

OTHER PUBLICATIONS

Podhorodeski et al., "Resolving redundant manipulator joint rates and identifying special arm configurations using Jacobian null-space bases", IEEE Transactions on Robotics and Automation, Oct. 1991, 607-618, vol. 7, No. 5.

Kang et al. "Joint torque optimization of redundant manipulators via the null space damping method", Robotics and Automation, 1992. Proceedings., 1992 IEEE International Conference on vol. 1,, May 12, 1992, 520-525.

International Search Report for corresponding International Application No. PCT/JP2011/071137, Nov. 8, 2011.

Written Opinion for corresponding International Application No. PCT/JP2011/071137, Nov. 8, 2011.

Japanese Office Action for corresponding JP Application No. 2013-533415, Aug. 4, 2015.

ROBOT SYSTEM, ROBOT CONTROL DEVICE AND METHOD FOR CONTROLLING ROBOT

CROSS-REFERENCE TO RELATED APPLICATION

The present application is a continuation application of International Application No. PCT/JP2011/071137, filed Sep. 15, 2011. The contents of these applications are incorporated herein by reference in their entirety.

FIELD

The embodiment discussed herein is directed to a robot system, a robot control device and a method for controlling a robot.

BACKGROUND

Patent Literature 1 discloses an operation locus teaching method for a robot, which is capable of creating operation locus teaching data using a robot having a redundant degree of freedom not affecting robot work, in addition to a degree of freedom required for work by the robot.

This operation locus teaching method is characterized in that the redundant degree of freedom is decided based on an evaluation function having the redundant degree of freedom as an element and representing a margin of a joint angle space of the robot.

CITATION LIST

Patent Literature

Patent Literature 1: Japanese Patent Application Laid-open No. H6-187020

SUMMARY

According to one aspect of embodiments, a robot system includes a robot, and a robot control device that controls the robot. The robot has a plurality of joint axes including a redundant axis, the joint axes being driven by a servomotor. The robot control device has a first command generator, a limit avoidance command generator, a posture optimization command generator, a null space matrix calculator, a second command generator and a controller. The first command generator generates a first joint angular speed command for the robot on the basis of an input speed command for a control point of the robot. The limit avoidance command generator generates a joint angular speed command A for the robot for avoiding a state in which the robot reaches an operating limit, on the basis of an evaluation function A, while a signal A is being input. The posture optimization command generator generates a joint angular speed command B for the robot for optimizing a posture of the robot, on the basis of an evaluation function B, while a signal B is being input. The null space matrix calculator calculates a null space matrix of a Jacobian matrix related to the control point. The second command generator generates a second joint angular speed command for the robot on the basis of the joint angular speed command A, the joint angular speed command B, and the null space matrix. The controller controls the servomotor on the basis of a third joint angular speed command that is a sum of the first and second joint angular speed commands.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Figure 1:
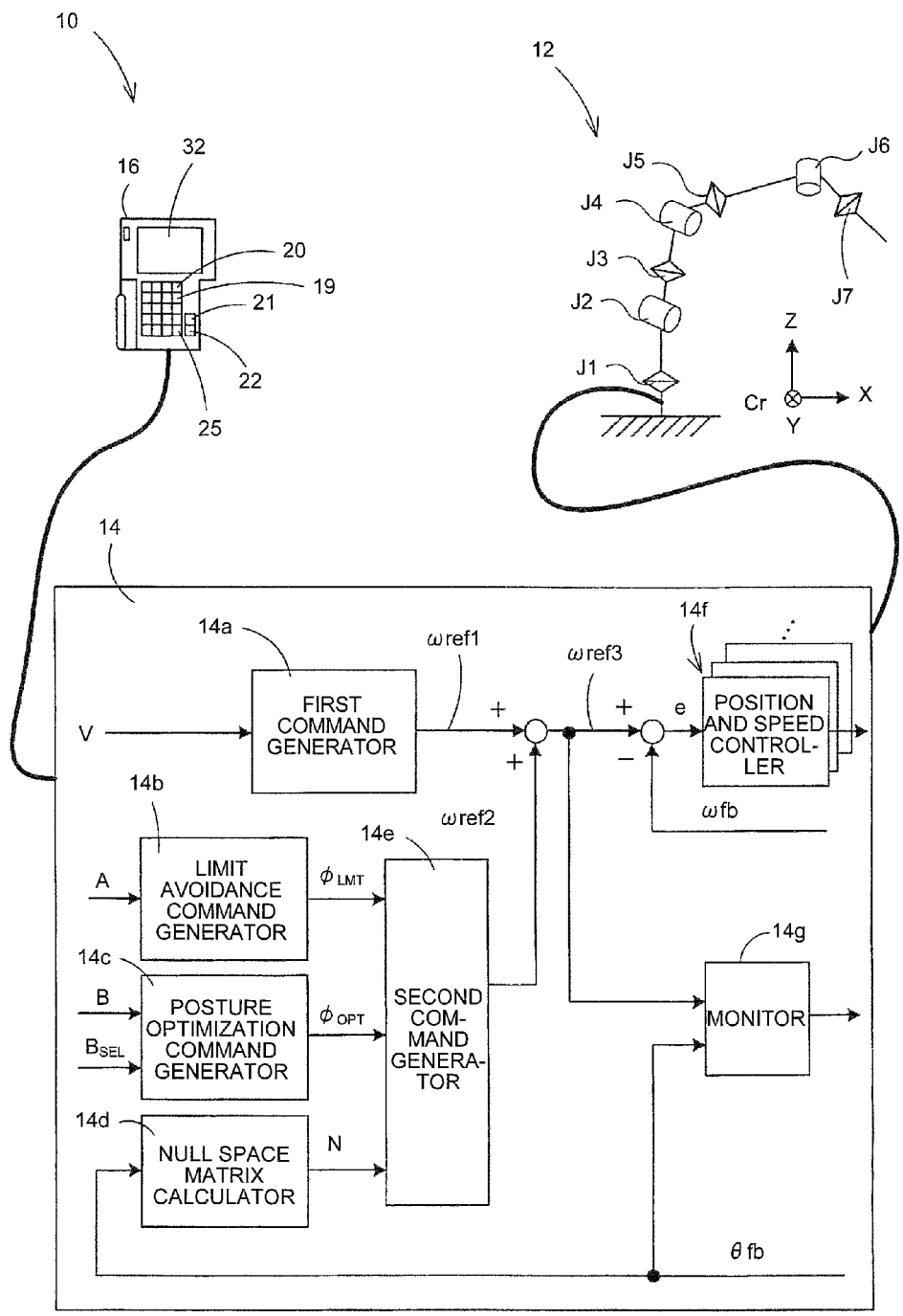
FIG. 1 is a configuration diagram of a robot system according to a first embodiment.

Embodiments will now be described with reference to the accompanying drawings to provide understanding of the embodiments. In the drawings, parts that are not related to the description may be omitted.

First Embodiment

A robot system 10 according to a first embodiment includes, as illustrated in FIG. 1, a robot 12 having first to seventh joint axes J1 to J7, a robot control device 14 controlling operation of the robot 12, and a teaching pendant 16 for teaching a position and posture of the robot 12.

A robot coordinate system Cr illustrated in FIG. 1 is, for example, an orthogonal coordinate system. In the orthogonal coordinate system, the origin is at a point on the first joint axis J1 of the robot 12, the X axis extends in the front-back direction of the robot 12, the Y axis extends in the left-right direction, and the Z axis extends in the up-down direction.

The robot 12 is a redundant robot, for example, a seven-axis vertical multi-articulated robot including the joint axis J3 as a redundant axis. Each of the joint axes J1 to J7 is driven by a servomotor (not illustrated) containing an encoder. The robot 12 is not limited to a seven-axis vertical multi-articulated robot. Other examples of the robot include a robot having a joint axis redundantly with the degrees of freedom of the work space of the robot. For example, a three-axis robot having only three joints each rotating around the Y axis of the robot coordinate system Cr has redundancy on the XZ plane. This three-axis robot is therefore a robot that has a joint axis redundantly in relation to operation on the XZ plane. That is, the robot may be any redundant robot that has a redundant degree of freedom, irrespective of the number of axes of joints and the axial configuration.

The robot control device 14 is connected to the robot 12. The robot control device 14 includes a first command generator 14a, a limit avoidance command generator 14b, a posture optimization command generator 14c, a null space matrix calculator 14d, a second command generator 14e, a position and speed controller (an example of the controller) 14f, and a monitor 14g. The robot control device 14 is installed with a CPU (not illustrated), and the function of each block illustrated in FIG. 1 is implemented by a software program executed by the CPU or hardware.

With input of a speed command V for the hand of the robot 12 (hereinafter simply referred to as "hand speed command"), the first command generator 14a can generate a joint angular speed command (first joint angular speed command) ωref1, based on the speed command V.

With input of a signal A from the teaching pendant 16, the limit avoidance command generator 14b can output a joint angular speed command (joint angular speed command A) $\phi_{LMT}$ for the robot 12 to avoid a limit. The signal A will be described later.

Here, the limit refers to a state in which the robot 12 reaches an operating limit, and includes, for example, the following first to third limits.

The first limit is a limit in a case where a joint axis reaches a movable limit angle. The movable limit angle includes a movable limit angle that is mechanically determined in terms of the design of the robot 12, and a movable limit angle that is set as desired by software. Either limit can be applied.

The second limit is a limit in a case where the robot 12 approaches an obstruction (for example, peripheral equipment or any other robots) to a distance set by software.

The third limit is a limit in a case where the robot 12 approaches a singular posture to a range set by software. The robot reaching the third limit is given an excessive joint angular speed command. Here, the singular posture of the robot is a posture in which a particular degree of freedom is lost due to a kinetic state such as the position of a joint of the robot and the direction of a rotor axis. For example, if an operation command is given in a particular direction in a posture in which the second joint axis J2, the fourth joint axis J4, and the sixth joint axis J6 of the robot 12 lie on a straight line, the joint angular speed commands for these joints become excessive.

The limit avoidance command generator 14b can generate 1) a joint angular speed command $\phi_{JLC}$ for avoiding the first limit, 2) a joint angular speed command $\phi_{OAC}$ for avoiding the second limit, and 3) a joint angular speed command $\phi_{SAC}$ for avoiding the third limit, in accordance with the kinds of limits as described above. The detailed method of generating these joint angular speed commands $\phi_{JLC}$, $\phi_{OAC}$, $\phi_{SAC}$ will be described later.

The limit avoidance command generator 14b can output the sum of the generated joint angular speed commands $\phi_{JLC}$, $\phi_{OAC}$, $\phi_{SAC}$ as a joint angular speed command $\phi_{LMT}$.

With input of a signal B from the teaching pendant 16, the posture optimization command generator 14c can output a joint angular speed command (joint angular speed command B) $\phi_{OPT}$ for optimizing the posture of the robot 12. The signal B will be described later.

Here, the optimization of a posture of the robot 12 includes, for example, the following first and second optimizations. The first optimization is an optimization for reducing the operating time of the robot 12. The second optimization is an optimization for improving manipulability of the robot 12.

The posture optimization command generator 14c can generate 1) a joint angular speed command $\phi_{TMC}$ for reducing the operating time and 2) a joint angular speed command $\phi_{SAC}$ for improving manipulability, in accordance with the kinds of optimizations. The detailed method of generating these joint angular speed commands $\phi_{TMC}$, $\phi_{SAC}$ will be described later. The kinds of optimizations are determined based on the value of a signal $B_{SEL}$ output from the teaching pendant 16.

The posture optimization command generator 14c can output the generated joint angular speed commands $\phi_{TMC}$, $\phi_{SAC}$ as a joint angular speed command $\phi_{OPT}$.

The null space matrix calculator 14d can calculate a null space matrix N of a Jacobian matrix J related to the hand (an example of the control point) of the robot 12, based on the joint angle of the robot 12. Specifically, the null space matrix calculator 14d can obtain the position and posture of the hand of the robot 12 and the direction of each of the joint axes J1 to J7 from the joint angle (the current value of the joint angle) and calculate the null space matrix of the Jacobian matrix related to the hand of the robot 12.

The null space matrix is an operation matrix for generating an operation command for the redundant degree of freedom with the position and posture of the hand being kept, in a redundant robot. Here, this operation command is not a command only to a particular axis, i.e., a redundant axis, but is a command to a redundant degree of freedom (the joint degree of freedom that does not affect the position and posture of the hand), wherein control target axes are all or some of the axes including the redundant axis and vary depending on the posture and the operating direction of the robot in each control cycle. Here, the control target axes will be described by taking a three-axis robot having only three joint axes (first to third joint axes) each rotating around the Y axis of the robot coordinate system Cr, as an example. The control target axis as a redundant degree of freedom in this case is not limited to one of the first to third joint axes of the three-axis robot but is at least one of the first to third joint axes that can rotate around the Y axis of the robot coordinate system Cr (that can change the posture) with the hand position being kept. Which of the joint axes is to be set as a control target axis is calculated using the null space matrix. For example, when the third joint axis reaches the operating limit and cannot contribute to the operation of moving the hand in the Z-axis direction or the X-axis direction, the control target axes as a redundant degree of freedom are the first joint axis and the second joint axis.

The null space matrix N is calculated by the following equation, based on the Jacobian matrix J related to the hand, the pseudo inverse matrix $J^+$ of the Jacobian matrix, and the unit matrix I.

$$N = I - J^+ J \qquad \text{Equation (1)}$$

When a part other than the hand of the robot 12 is set as a control target part (control point), the Jacobian matrix of the control target part is used.

The joint angle and the joint angular speed of the robot 12 are obtained based on the result of multiplying an encoder value fed-back from the encoder, by a reduction ratio.

The second command generator 14e can generate a joint angular speed command (second joint angular speed command) ωref2 based on the joint angular speed command $\phi_{LMT}$, the joint angular speed command $\phi_{OPT}$, and the null space matrix N. The generated joint angular speed command ωref2 is added to the joint angular speed command ωref1 generated by the first command generator 14a to yield a joint angular speed command (third joint angular speed command) ωref3 (see FIG. 1).

The position and speed controller 14f can control the servomotor based on a difference e between the joint angular speed command ωref3 and a joint angular speed feedback ωfb, and control the position and speed of each joint. In the present embodiment, the joint angular speed command ωref3 is used as a command to the position and speed controller 14f.

A joint angle command obtained by adding the joint angular speed command ωref3 to the current joint angle of the robot 12 may be used as a command to the position and speed controller 14f.

The number of the position and speed controllers 14f provided corresponds to the number of the joint axes J1 to J7 that constitute the robot 12.

The monitor 14g can determine whether the robot 12 reaches a limit. The monitor 14g can stop operation of the robot 12 and output an alarm when a limit is reached.

Specifically, the monitor 14g can determine whether the first limit is reached, by monitoring the angle of each of the joint axes J1 to J7.

The monitor 14g can also determine that the second limit is reached, by calculating the distance between the robot 12 and an obstruction based on the position and size of the obstruction that are registered in advance. When the position and size of the obstruction are not registered in the robot control device 14 in advance, the operator can determine by visual inspection that the second limit is reached, and then stop operation of the robot 12.

The monitor 14g can also determine whether the third limit is reached, by monitoring the posture of the robot 12 (the current value θfb of the joint angle of the robot 12) and the joint angular speed command ωref3, because an excessive joint angular speed command ωref3 is generated when the robot 12 approaches the singular posture. The singular posture of the robot 12 is a posture in which the second joint axis J2, the fourth joint axis J4, and the sixth joint axis J6 lie on a straight line. The singular posture of the robot varies depending on the configuration of the link.

The teaching pendant 16 is connected to the robot control device 14. The teaching pendant 16 is provided with a jog manipulation button 20, a first limit avoidance button (an example of the first signal output unit) 21, a first posture optimization button (an example of the second signal output unit) 22, and a display screen 32.

The operator of the robot 12 can use the jog manipulation button 20 provided on the teaching pendant 16 to jog-manipulate the robot 12 and teach a work program for the robot 12.

The operator can also use a replay button 19 provided on the teaching pendant 16 to perform a work program replay operation.

In addition, the operator can use the teaching pendant 16 to allow a control target part (control point) of the robot 12 to operate based on a designated coordinate system.

Here, the control target part is, for example, the hand of the robot 12. Other examples of the control target part include a particular part of a joint of the robot 12 and the tip of an end effector attached to the hand.

The designated coordinate system is, for example, the robot coordinate system Cr. When the robot coordinate system Cr is selected as the designated coordinate system, the hand of the robot 12 can be moved in the X-axis direction, the Y-axis direction, and the Z-axis direction as well as the rotation direction around the X axis, the rotation direction around the Y axis, and the rotation direction around the Z axis. Other examples of the designated coordinate system include a joint coordinate system and a coordinate system set as desired by the operator of the robot 12.

The jog manipulation button 20 is a button for the operator to jog-manipulate the robot 12. When the jog manipulation button 20 is pressed, the teaching pendant 16 outputs a preset hand speed command V.

The first limit avoidance button 21 is a button for the operator to give an instruction to avoid a limit. When the first limit avoidance button 21 is pressed, the teaching pendant 16 outputs the signal A. The first limit avoidance button 21 takes momentary action. That is, the teaching pendant 16 outputs the signal A while the first limit avoidance button 21 is being pressed.

The first posture optimization button 22 is a button for the operator to give an instruction to optimize a posture of the robot 12. When the first posture optimization button 22 is pressed, the teaching pendant 16 outputs the signal B. The first posture optimization button 22 takes momentary action. That is, the teaching pendant 16 outputs the signal B while the first posture optimization button 22 is being pressed.

Figure 5:
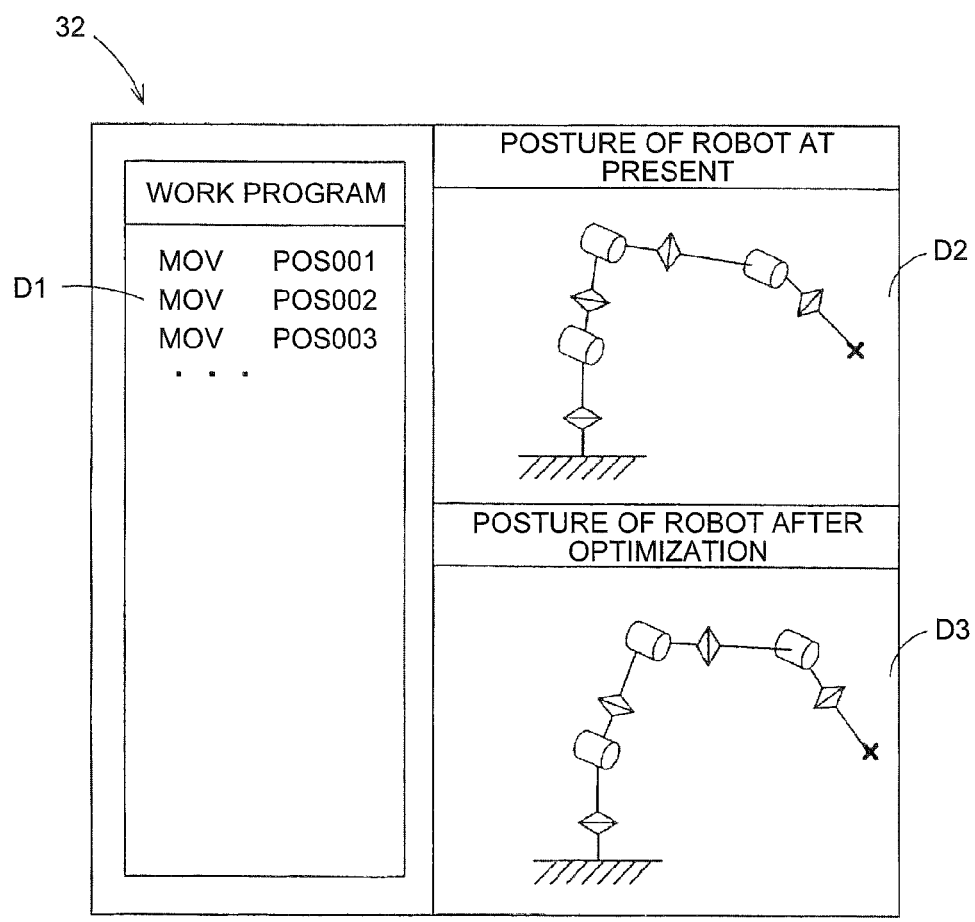
FIG. 5 is an illustration of a display screen provided on a teaching pendant of the robot system.

A display area corresponding to the function of the robot control device 14 is configured on the display screen 32 of the teaching pendant 16, and information such as characters and images is displayed in this display area. When a posture optimization assist function is performed for assisting in optimization of a posture of the robot 12 as described later, a display area D1 on the left side, a display area D2 on the upper right side, and a display area D3 on the lower right side are configured on the display screen 32, for example, as illustrated in FIG. 5. A work program in which teaching data for the robot 12 is written is displayed in the display area D1. A graphics image representing the posture of the robot 12 at present is displayed in the display area D2. A graphics image representing the robot 12 with the optimized posture is displayed in the display area D3.

Figure 6:
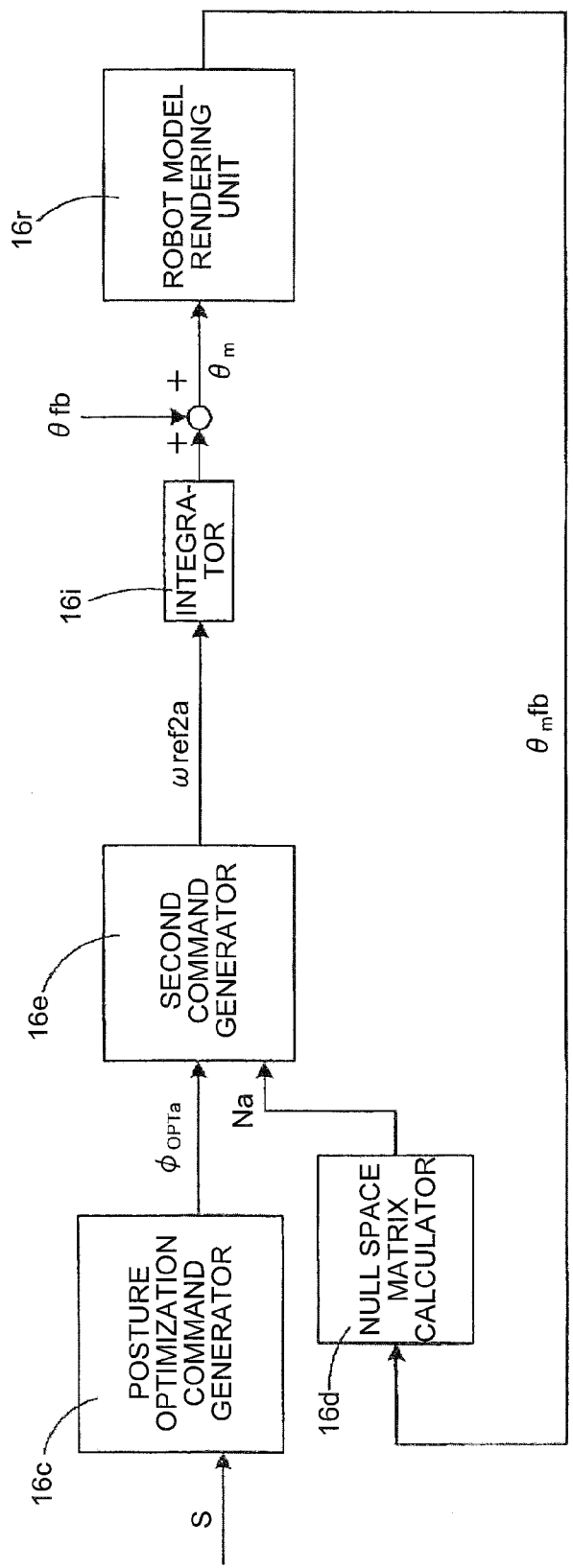
FIG. 6 is a functional block diagram of the teaching pendant of the robot system.

The teaching pendant 16 further includes a posture optimization command generator 16c, a null space matrix calculator 16d, a second command generator 16e, and a robot model rendering unit (an example of the rendering unit) 16r, as illustrated in FIG. 6.

The posture optimization command generator 16c operates substantially in the same manner as the posture optimization command generator 14c provided in the robot control device 14. With input of a signal S, the posture optimization command generator 16c can output a joint angular speed command $\phi_{OPTa}$ for optimizing a posture of the robot 12.

The null space matrix calculator 16d operates substantially in the same manner as the null space matrix calculator 14d provided in the robot control device 14. The null space matrix calculator 16d can calculate a null space matrix Na of the Jacobian matrix related to the hand of the robot model, based on a joint angle $\theta_m$fb output by the robot model rendering unit 16r.

The second command generator 16e operates substantially in the same manner as the second command generator 14e provided in the robot control device 14. The second command generator 16e can generate a joint angular speed command ωref2a based on the joint angular speed command $\phi_{OPTa}$ and the null space matrix Na. The generated joint angular speed command ωref2a is integrated by an integrator 16i and added to the current value θfb of the joint angle of the robot 12 that is transmitted from the robot control device 14, to yield a joint angle $\theta_m$.

The robot model rendering unit 16r can create a graphics image of the robot 12 based on the joint angle of the robot 12 and render the image on the display screen 32. The robot model rendering unit 16r can render a graphics image of the robot model having the joint angle θfb in the display area D2, based on the current value θfb of the joint angle of the robot 12 that is transmitted from the robot control device 14. If the joint angle θfb of the robot 12 changes, the robot model rendering unit updates the rendering of the graphics image as needed.

The robot model rendering unit 16r can also render a graphics image of the robot model whose joint angle is the angle $\theta_m$, in the display area D3, based on the joint angle $\theta_m$.

The teaching pendant 16 is provided with a switch button 25 (see FIG. 1) to switch a target manipulated by the operator to one of the actual robot 12 and the robot model displayed in the display area D3.

The posture optimization command generator 16c, the null space matrix calculator 16d, the second command generator 16e, and the robot model rendering unit 16r may not necessarily be provided in the teaching pendant 16. That is, the same configuration can be implemented such that some of the posture optimization command generator 16c, the null space matrix calculator 16d, the second command generator 16e, and the robot model rendering unit 16r are provided, for example, in the robot control device 14, and the robot control device 14 and the teaching pendant 16 communicate with each other to transmit/receive data.

Figure 2:
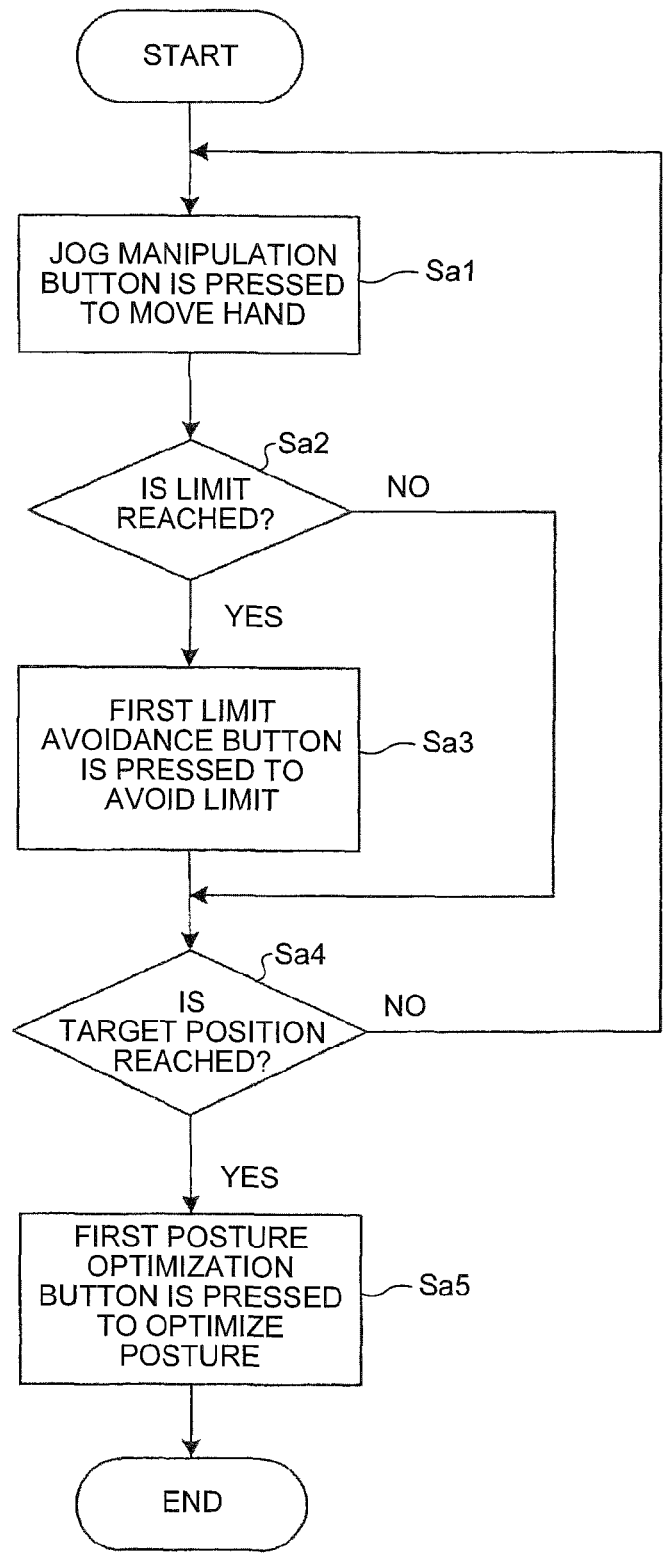
FIG. 2 is a flowchart illustrating operation of the robot system.

Referring now to FIG. 2, the operation of the robot system 10 will be described.

The operator can manipulate the position and posture of the hand of the robot 12 by pressing the jog manipulation button 20. If the robot 12 reaches a limit while the position and posture of the hand is being manipulated, the operator can press the first limit avoidance button 21 to allow all the joint axes J1 to J7 of the robot 12 including the redundant axis J3 to operate, and avoid the limit with the position and posture of the hand being kept. The operator can also press the first posture optimization button 22 to allow all the joint axes J1 to J7 of the robot 12 including the redundant axis J3 to operate, and optimize a posture of the robot 12 with the position and posture of the hand being kept.

(Step Sa1)

The operator presses the jog manipulation button 20 to move the hand of the robot 12 to the desired position and posture. The hand speed command V is input from the teaching pendant 16 to the first command generator 14a illustrated in FIG. 1. The first command generator 14a generates the joint angular speed command ωref1 using Equation (2), based on the hand speed command V and the pseudo inverse matrix $J^+$ of the Jacobian matrix related to the hand of the robot 12.

$$\omega \text{ref1} = J^+ V \quad \text{Equation (2)}$$

The first command generator 14a may generate the joint angular speed command ωref1 without using Equation (2). For example, the first command generator 14a may generate the joint angular speed command ωref1 by integrating the hand speed command V for conversion into a hand position command and thereafter performing an inverse kinematics calculation.

(Step Sa2)

The monitor 14g determines whether the robot 12 reaches a limit.

When the monitor 14g determines that the robot 12 reaches a limit, the robot 12 is stopped, and an alarm is output. The limit avoidance operation for avoiding a limit at the next step Sa3 is thereafter performed.

When the monitor 14g determines that the robot 12 does not reach a limit, the processing proceeds to step Sa4.

(Step Sa3)

Figure 3:
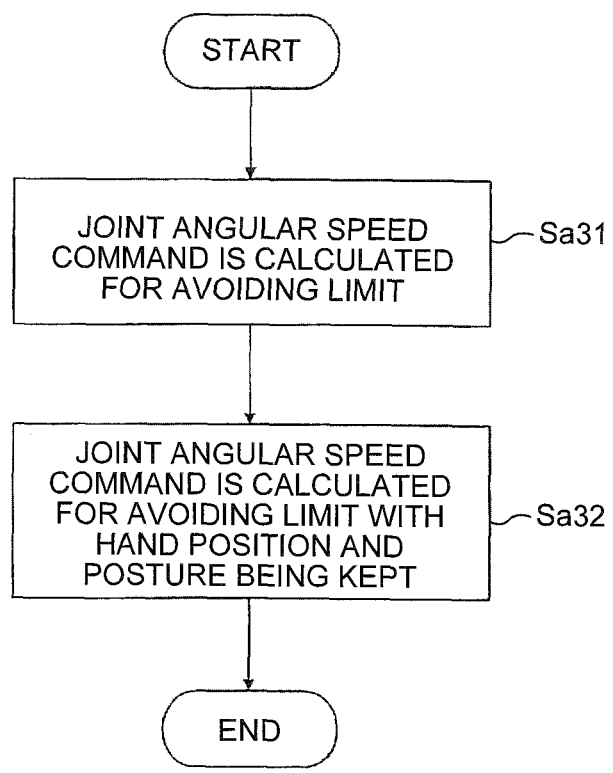
FIG. 3 is a flowchart illustrating a limit avoidance operation of the robot system.

When the operator of the robot 12 releases the finger from the jog manipulation button 20 and presses the first limit avoidance button 21, the signal A is input to the limit avoidance command generator 14b (see FIG. 1), whereby the following step Sa31 and step Sa32 (see FIG. 3) are processed in order.

As a result, the robot 12 performs the limit avoidance operation for avoiding a limit.

(Step Sa31)

The limit avoidance command generator 14b calculates the joint angular speed commands $\phi_{JLC}$, $\phi_{OAC}$, $\phi_{SAC}$ for avoiding the first to third limits, respectively, in accordance with the alarm output by the monitor 14g. A method of calculating each of the joint angular speed commands $\phi_{JLC}$, $\phi_{OAC}$, $\phi_{SAC}$ will be described below.

(1) Calculation of Joint Angular Speed Command $\phi_{JLC}$

The joint angular speed command $\phi_{JLC}$ for avoiding the first limit is calculated by Equation (3), Equation (4a), and Equation (4b), based on an evaluation function $V_{JLC}$ (an example of the evaluation function A).

$$\phi_{JLC} = -\text{grad}(V_{JLC}) \quad \text{Equation (3)}$$

When $\theta_- < \theta < \theta_+$:

$$V_{JLC} = 0 \quad \text{Equation (4a)}$$

Except when $\theta_- < \theta < \theta_+$:

$$V_{JLC} = 0.5 K_{JLC} (\theta_{LIM} - \theta)^2 \quad \text{Equation (4b)}$$

The processing of Equation (3), Equation (4a), and Equation (4b) is performed for each of the joint axes J1 to J7. The coefficient $K_{JLC}$ is the gain (weight) of the joint angular speed command.

The angle $\theta_{LIM}$ is a set angle set as an angle (movable limit angle) for limiting the movable range of each joint. The angle θ is the current value of the angle of each joint.

Figure 7:
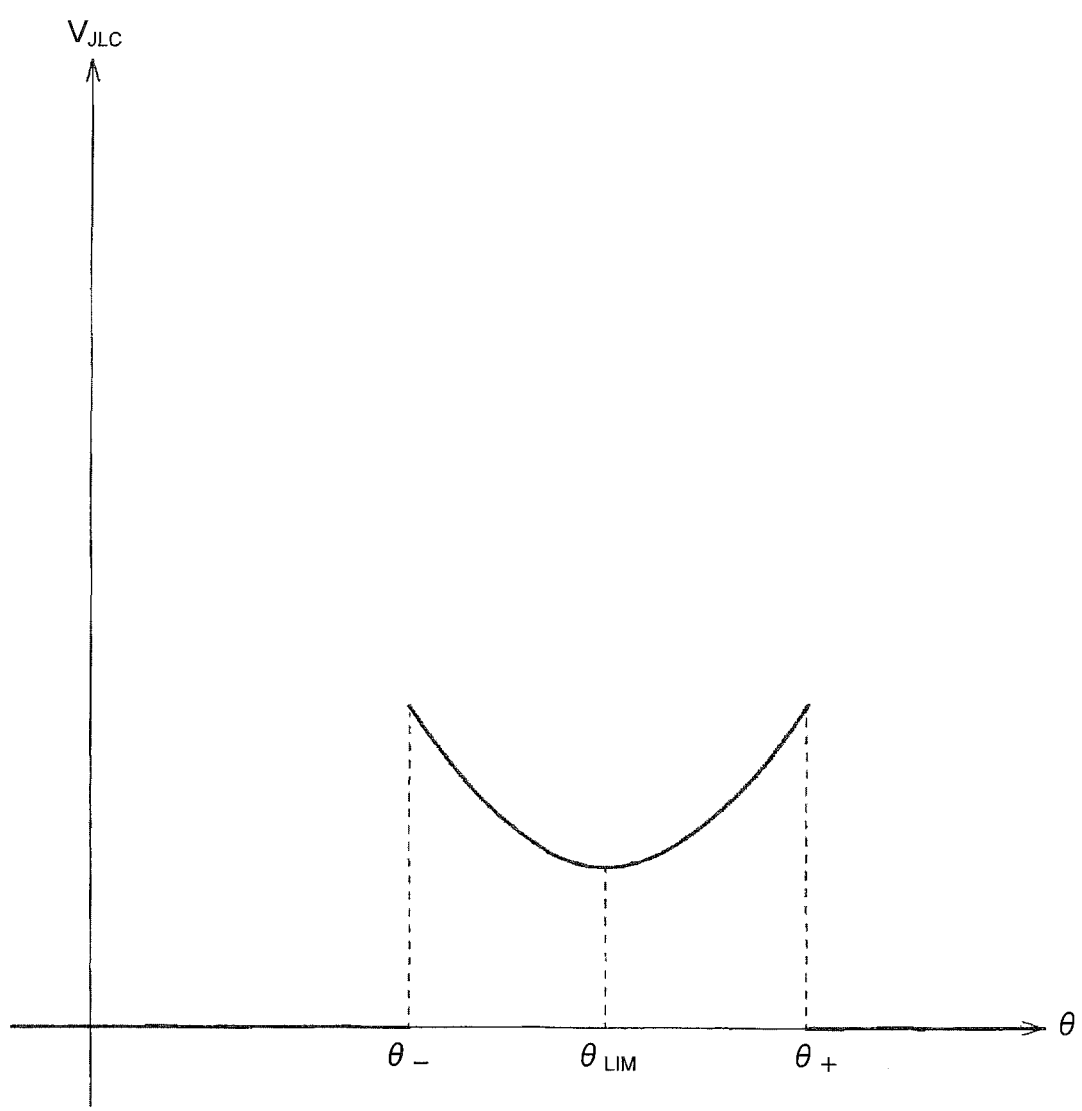
FIG. 7 is an illustration of an evaluation function $V_{JLC}$ calculated by a limit avoidance command generator of a robot control device of the robot system.

The angle $\theta_-$ and the angle $\theta_+$ are the upper limit and the lower limit, respectively, of the set angle $\theta_{LIM}$ and represent the limit area in which the evaluation function $V_{JLC}$ is calculated (see FIG. 7).

As indicated by Equation (4a) and Equation (4b), the evaluation function $V_{JLC}$ is calculated only for the joint that enters the limit area, and the evaluation function $V_{JLC}$ is set to zero for the other joints. When the avoidance of the first limit is completed, the joint angle command becomes zero.

The evaluation function $V_{JLC}$ is obtained based on the magnitude of the difference between the set angle $\theta_{LIM}$ and the angle feedback (the current value of the joint angle) θ of each joint, as indicated by Equation (4b).

The joint angular speed command $\phi_{JLC}$ is then calculated such that the joint goes away from the joint movable range, from the gradient of the evaluation function $V_{JLC}$.

(2) Calculation of Joint Angular Speed Command $\phi_{OAC}$

The joint angular speed command $\phi_{OAC}$ for avoiding the second limit is calculated by Equation (5), Equation (6a), and Equation (6b), based on an evaluation function $V_{OAC}$ (an example of the evaluation function A).

$$\phi_{OAC} = J_P^T \text{grad}(V_{OAC}) \quad \text{Equation (5)}$$

When $D_- < D < D_+$:

$$V_{OAC} = 0 \quad \text{Equation (6a)}$$

Except when $D_- < D < D_+$:

$$V_{OAC} = 0.5 K_{OAC} (D_{LIM} - D)^2 \quad \text{Equation (6b)}$$

In Equation (5), the matrix $J_P$ is the Jacobian matrix of the closest point calculated from a part (closest point) of the robot 12 that is closest to an obstruction. While the robot 12 is avoiding the limit, the closest point is newly calculated when the current value of the joint angle of the robot 12 is changed.

The processing of Equation (5) is performed for each of the joint axes J1 to J7. The processing of Equation (6a) and Equation (6b) is performed for each axis (the X axis, the Y axis, and the Z axis) of the robot coordinate system Cr. The coefficient $K_{OAC}$ is the gain (weight) of the avoidance command.

The distance $D_{LIM}$ is a set distance set as a distance by which the robot 12 can approach an obstruction. The obstruction is set as model data in the robot control device 14, for example, by reading CAD data or model data of an offline simulator. As another example, the obstruction is set by actually measuring data of the obstruction using a camera or a laser sensor. As yet another example, the obstruction is set by the operator manipulating the teaching pendant 16.

The distance D is the shortest distance from the obstruction to the robot 12.

Figure 8:
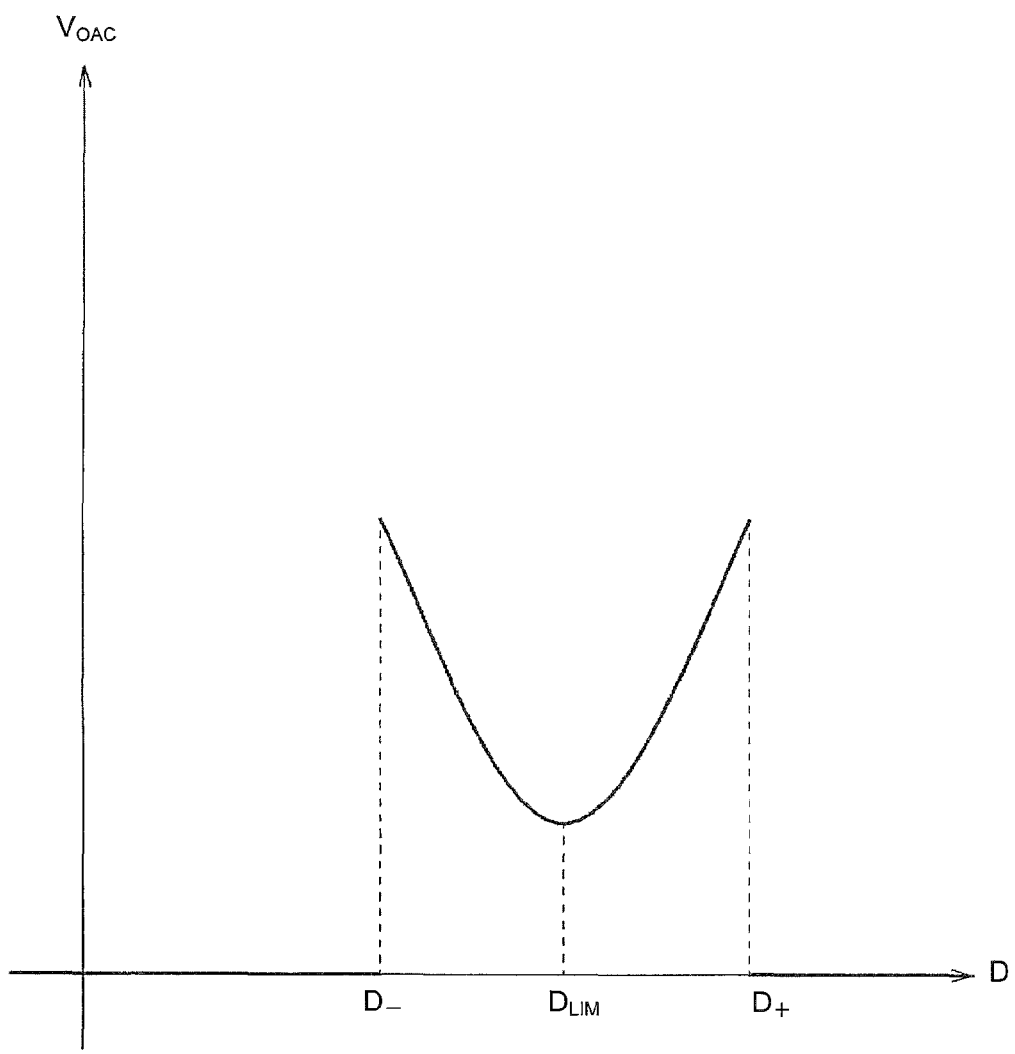
FIG. 8 is an illustration of an evaluation function $V_{OAC}$ calculated by the limit avoidance command generator of the robot control device of the robot system.

The distance $D_-$ and the distance $ID_+$ are the upper limit and the lower limit, respectively, of the distance $D_{LIM}$ and represent the limit area in which the evaluation function $V_{OAC}$ is calculated (see FIG. 8).

As indicated by Equation (6a) and Equation (6b), the evaluation function $V_{OAC}$ is calculated in the case where the robot 12 enters the limit area, and the evaluation function $V_{OAC}$ is set to zero in the other cases. When the avoidance of the second limit is completed, the joint angular speed command $\phi_{OAC}$ becomes zero.

The evaluation function $V_{OAC}$ is obtained based on the magnitude of the difference between the distance $D_{LIM}$ and the distance D, as indicated by Equation (6b).

The joint angular speed command $\phi_{OAC}$ is then calculated from the gradient of the evaluation function $V_{OAC}$ and the Jacobian matrix $J_P$ such that the robot 12 goes away from the obstruction.

(3) Calculation of Joint Angular Speed Command $\phi_{SAC}$

The joint angular speed command $\phi_{SAC}$ for avoiding the third limit is calculated by Equation (7), Equation (8a), and Equation (8b), based on an evaluation function $V_{SAC}$ (an example of the evaluation function A).

$$\phi_{SAC} = \text{grad}(V_{SAC}) \quad \text{Equation (7)}$$

When $\omega_- < \omega < \omega_+$:

$$V_{SAC} = 0 \quad \text{Equation (8a)}$$

Except when $\omega_- < \omega < \omega_+$:

[Formula 1]

$$V_{SAC} = K_{SAC}\sqrt{\det(J^T J)} \quad \text{Equation (8b)}$$

The processing of Equation (7), Equation (8a), and Equation (8b) is performed for each of the joint axes J1 to J7. The coefficient $K_{SAC}$ is the gain (weight) of the joint angular speed command.

The angular speed command $\omega$ is the angular speed command for each joint.

The angular speed $\omega_-$ and the angular speed $\omega_+$ are the upper limit and the lower limit, respectively, of the angular speed command $\omega$ for a joint and represent the limit angular speed in which the evaluation function $V_{SAC}$ is calculated.

As indicated by Equation (8a) and Equation (8b), the evaluation function $V_{SAC}$ is calculated only for the joint given the joint angular speed command $\omega$ exceeding the limit angular speed $\omega_-$, $\omega_+$, and the evaluation function $V_{SAC}$ is set to zero for the other joints. When the avoidance of the third limit is completed, the joint angular speed command $\phi_{SAC}$ becomes zero.

Whether the case is Equation (8a) or Equation (8b) is determined based on the angular speed command $\omega$. Determination of the singular posture is made before the case determination. That is, the determination as to the posture of the robot 12 is carried out in advance, and Equation (8a) or Equation (8b) is calculated after the singular posture is determined.

The evaluation function $V_{SAC}$ is obtained based on the manipulability of the hand of the robot 12, as indicated by Equation (8b).

The joint angular speed command $\phi_{SAC}$ is then calculated from the gradient of the evaluation function $V_{SAC}$ such that the joint goes away from the singular point.

The limit avoidance command generator 14b outputs the generated joint angular speed commands $\phi_{JLC}$, $\phi_{OAC}$, $\phi_{SAC}$ as the joint angular speed command $\phi_{LMT}$.

The limit avoidance command generator 14b outputs the sum of the generated joint angular speed commands $\phi_{JLC}$, $\phi_{OAC}$, $\phi_{SAC}$ as the joint angular speed command $\phi_{LMT}$. That is, when two or more limits occur, the sum of the joint angular speed commands for avoiding the corresponding limits is the joint angular speed command $\phi_{LMT}$.

(Step Sa32)

The second command generator 14e calculates the joint angular speed command $\omega_{LMT}$ for avoiding a limit by the following equation with the position and posture of the hand being kept using the null space matrix N, and generates the calculated joint angular speed command $\omega_{LMT}$ as the joint angular speed command $\omega$ref2. As previously mentioned, the null space matrix N is used to decide a control target axis as the redundant degree of freedom in each control cycle and calculate the joint angular speed command $\omega_{LMT}$.

$$\omega_{LMT} = N\phi_{LMT} \quad \text{Equation (9)}$$

Here, the joint angular speed command $\phi_{LMT}$ is the sum of the joint angular speed commands $\phi_{JLC}$, $\phi_{OAC}$, $\phi_{SAC}$ for limit avoidance that are output by the limit avoidance command generator 14b.

Other than Equation (9), Equation (10) to Equation (12) may be used to calculate the joint angular speed command $\omega_{LMT}$ for avoiding a limit with the position and posture of the hand being kept.

$$V_{LMT} = J\phi_{LMT} \quad \text{Equation (10)}$$

where $V_{LMT}$ is a virtual hand speed command calculated from $\phi_{LMT}$.

[Formula 2]

$$\bar{\phi}_{LMT} = J^+ V_{LTM} \quad \text{Equation (11)}$$

where $\bar{\phi}_{LMT}$ is a virtual joint angular speed command calculated from $V_{LMT}$.

[Formula 3]

$$\omega_{LMT} = \phi_{LMT} - \bar{\phi}_{LMT} \quad \text{Equation (12)}$$

The first term ($\phi_{LMT}$) of Equation (12) is a joint angular speed for avoiding a limit. The second term of Equation (12) is a joint angular speed command in which the angular speed norm is the smallest among joint angular speeds that produce $V_{LMT}$. Since the first term and the second term are different, limit avoidance can be performed with the position and posture of the hand being kept.

When the operator of the robot 12 releases the finger from the first limit avoidance button 21, the joint angular speed command $\omega$ref2 output by the second command generator 14e becomes zero.

As described above, step Sa31 and step Sa32 are processed in order, whereby the limit avoidance operation at step Sa3 is performed.

As described above, when the robot 12 reaches a limit, the first limit avoidance button 21 can be used to reduce the time and effort for the operator of the robot 12 on concentrating on the avoidance operation, for example, in which direction and how many times the redundant axis should be moved to avoid a limit. That is, the operator can perform limit avoidance online by pressing the first limit avoidance button 21. The operator can also decide the operating angle of a joint of the actual robot 12 by adjusting the time for pressing the first limit avoidance button 21.

(Step Sa4)

The operator determines whether the position and posture of the hand of the robot 12 reaches the desired position and posture.

When the operator determines that the desired position and posture is reached, the next step Sa5 is performed.

On the other hand, when the operator determines that the desired position and posture is not reached, step Sa1 is performed. That is, the operator moves the robot 12 again using the teaching pendant 16. However, when the robot 12 reaches the limit (reach limit) of the operating range, the robot 12 cannot move any further in a predetermined direction. The reach limit is decided by design parameters such as the link length and the joint movable range of the robot 12. The reach limit is preset in the robot control device 14.

(Step Sa5)

Figure 4:
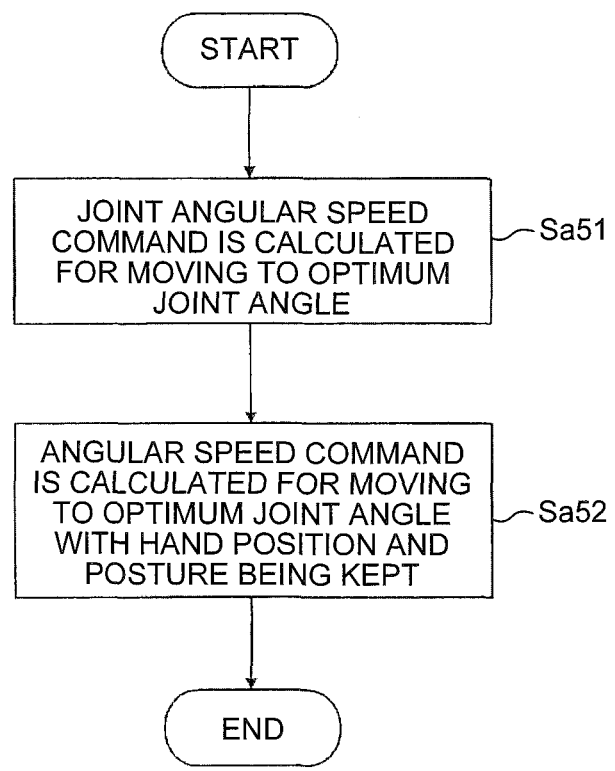
FIG. 4 is a flowchart illustrating a posture optimization operation of the robot system.

When the position and posture of the hand reaches the desired position and posture, the operator selects the kind of optimization (the first optimization or the second optimization), and the operator of the robot 12 presses the first posture optimization button 22 to input the signal $B_{SEL}$ and the signal B to the posture optimization command generator 14c. The following step Sa51 and step Sa52 (see FIG. 4) are thereafter processed in order.

As a result, the posture optimization operation is performed to optimize a posture of the robot 12 having a redundant degree of freedom with the position and posture of the hand being kept, using the redundant degree of freedom of the robot 12.

(Step Sa51)

The posture optimization command generator 14c illustrated in FIG. 1 calculates the joint angular speed command $\phi_{TMC}$ for reducing the operating time or the joint angular speed command $\phi_{SAC}$ for improving manipulability, in accordance with the kind of optimization (the value of the signal $B_{SEL}$) selected by the operator. It is noted that the same variable $\phi_{SAC}$ is used because $\phi_{SAC}$ for avoiding the third limit that is generated by the limit avoidance command generator 14b and $\phi_{SAC}$ for improving manipulability that is generated by the posture optimization command generator 14c both are commands to move away from the singular point.

(1) Calculation of Joint Angular Speed Command $\phi_{TMC}$

The joint angular speed command $\phi_{TMC}$ for reducing the operating time is calculated by Equation (13) and Equation (14), based on the evaluation function $V_{TMC}$ (an example of the evaluation function B).

$$\phi_{TMC} = \text{grad}(V_{TMC}) \qquad \text{Equation (13)}$$

$$V_{TMC} = 0.5 K_{TMC}(\theta_{TMC} - \theta)^2 \qquad \text{Equation (14)}$$

In Equation (13) and Equation (14), the variable i denotes the number (1 to 7) of a joint axis. The coefficient $K_{TMC}$ is the gain (weight) of the joint angular speed command.

The angle $\theta_{TMC}$ is the joint angle at the previous teaching point (the teaching point immediately preceding the current teaching point). The operating time of the robot 12 from the previous teaching point to the current teaching point can be reduced by controlling the joint angle of the joint axis of the robot 12 at the current teaching point such that it approaches the joint angle of the joint axis of the robot 12 at the previous teaching point. Which axis is to be set as a control target (to be given the joint angular speed command for reducing the operating time) varies depending on the posture and the operating direction of the robot in each control cycle and is calculated using the null space matrix N.

The angle $\theta$ is the current value of the angle of each joint.

As indicated by Equation (14), the evaluation function $V_{TMC}$ is obtained based on the magnitude of the difference between the angle $\theta_{TMC}$ and the angle feedback of each joint (the current value of the angle of each joint) $\theta$.

The joint angular speed command close to the previous teaching position, that is, the joint angular speed command $\phi_{TMC}$ for reducing the operating time, is then calculated from the gradient of the evaluation function $V_{TMC}$.

The operating time can be reduced more by setting a large gain for the joint with a great maximum operating speed. That is, a more efficient operation command is generated by allowing the joint with a great operating speed to operate by a large amount and allowing the joint with a small operating speed to operate by a small amount.

(2) Calculation of Joint Angular Speed Command $\phi_{SAC}$

The joint angular speed command $\phi_{SAC}$ for improving manipulability is calculated by Equation (15) and Equation (16), based on an evaluation function $V_{SAC}$ (an example of the evaluation function B).

$$\phi_{SAC} = -\text{grad}(V_{SAC}) \qquad \text{Equation (15)}$$

[Formula 4]

$$V_{SAC} = K_{SACi} \sqrt{\det(J^T J)} \qquad \text{Equation (16)}$$

As indicated by Equation (15) and Equation (16), the evaluation function $V_{SAC}$ is calculated based on the manipulability of the robot 12, and the joint angular speed command $\phi_{SAC}$ is generated by the same method as in the singular point avoidance at step Sa31.

(Step Sa52)

The second command generator 14e illustrated in FIG. 1 calculates the joint angular speed command $\omega_{OPT}$ by the following equation for optimizing a posture of the robot 12 with the position and posture of the hand being kept using the null space matrix N and generates the calculated joint angular speed command $\omega_{OPT}$ as the joint angular speed command $\omega$ref2.

$$\omega_{OPT} = N\phi_{OPT} \qquad \text{Equation (17)}$$

Here, the joint angular speed command $\phi_{OPT}$ is either of the joint angular speed commands $\phi_{TMC}$, $\phi_{SAC}$ for optimizing the posture of the robot 12 that are output by the posture optimization command generator 14c.

When the operator of the robot 12 releases the finger from the first posture optimization button 22, the joint angular speed command $\omega$ref2 output by the second command generator 14e becomes zero.

As described above, step Sa51 and step Sa52 are processed in order, whereby the posture optimization operation at step Sa5 is performed.

As described above, a posture of the robot 12 can be optimized with the position and posture of the hand being kept using the null space matrix N related to the hand.

Here, at step Sa5, the operator of the robot 12 can predict the behavior in the posture optimization operation of the robot 12, using the robot posture optimization assist function. The robot posture optimization assist function will be described below.

As previously mentioned, the graphics image of the robot model at present is rendered by the robot model rendering unit 16r illustrated in FIG. 6, in the display area D2. The graphics image of the robot model with the optimized posture is rendered in the display area D3 by the robot model rendering unit 16r.

First, after the hand of the robot 12 reaches the desired position and posture, the operator presses the switch button 25 illustrated in FIG. 1 to switch the manipulation target from the actual robot 12 to the robot model displayed in the display area D3. The kind of optimization (the first optimization or the second optimization) is also selected.

The operator then presses the first posture optimization button 22. The signal S (see FIG. 6) is input to the posture optimization command generator 16c of the teaching pendant 16. The posture optimization command generator 16c calculates the joint angular speed command $\phi_{OPTa}$ in accordance with the kind of optimization selected by the operator of the robot 12. The second command generator 16e generates the joint angular speed command $\omega ref2a$ based on the joint angular speed command $\phi_{OPTa}$ calculated by the posture optimization command generator 16c and the null space matrix Na calculated by the null space matrix calculator 16d.

The robot model rendering unit 16r renders the graphics image of the robot model at the joint angle $\theta_m$ in the display area D3, based on the joint angle $\theta_m$ obtained by adding the current value $\theta fb$ of the joint angle of the robot 12 that is transmitted from the robot control device 14, to the joint angular speed command integrated by the integrator 16i. That is, the graphics image of the robot 12 with the optimized posture is displayed in the display area D3.

The operator can decide the operating angle (the degree of optimization) of the joint of the robot model by adjusting the time for pressing the first posture optimization button 22.

The robot 12 optimized by the second optimization (optimization for improving manipulability) is rendered in the display area D3 illustrated in FIG. 5. When compared with the posture of the robot 12 at present that is rendered in the display area D2, the robot 12 rendered in the display area D3 is improved in manipulability of the hand.

As described above, the operator can view the graphics image of the robot 12 with the optimized posture on the display area D3 by performing the posture optimization assist function.

An individual evaluation index may be selected for each teaching position, and the redundant degree of freedom can be optimized with the selected evaluation index, rather than deciding the redundant degree of freedom related to all the teaching data using a uniform evaluation index (for example, evaluation function) decided in advance. In other words, the operator can select optimization means for each teaching point, rather than optimizing all the positions related to teaching data in the work program with the same evaluation index.

Next, after viewing the posture of the robot model in the display area D3, the operator presses the switch button 25 (see FIG. 1) again to switch the manipulation target from the robot model displayed in the display area D3 to the actual robot.

The operator can decide the final teaching position by optimizing the posture of the redundant degree of freedom of the actual robot 12.

The operator can decide the operating angle (the degree of optimization) of a joint of the actual robot 12 by adjusting the time for pressing the first posture optimization button 22.

As described above, the robot system according to the present embodiment can avoid a limit with the position and posture of the hand being kept, before the robot 12 reaches a limit. After the robot 12 reaches a target position, the posture of the redundant degree of freedom can be optimized with the position and posture of the hand being kept. That is, the operator can decide online the joint angle of the robot 12 including the redundant degree of freedom, thereby improving the manipulability of the redundant robot.

Second Embodiment

The robot system according to a second embodiment will now be described. The same components as in the robot system 10 according to the first embodiment are denoted with the same reference signs, and a detailed description thereof may be omitted.

Figure 9:
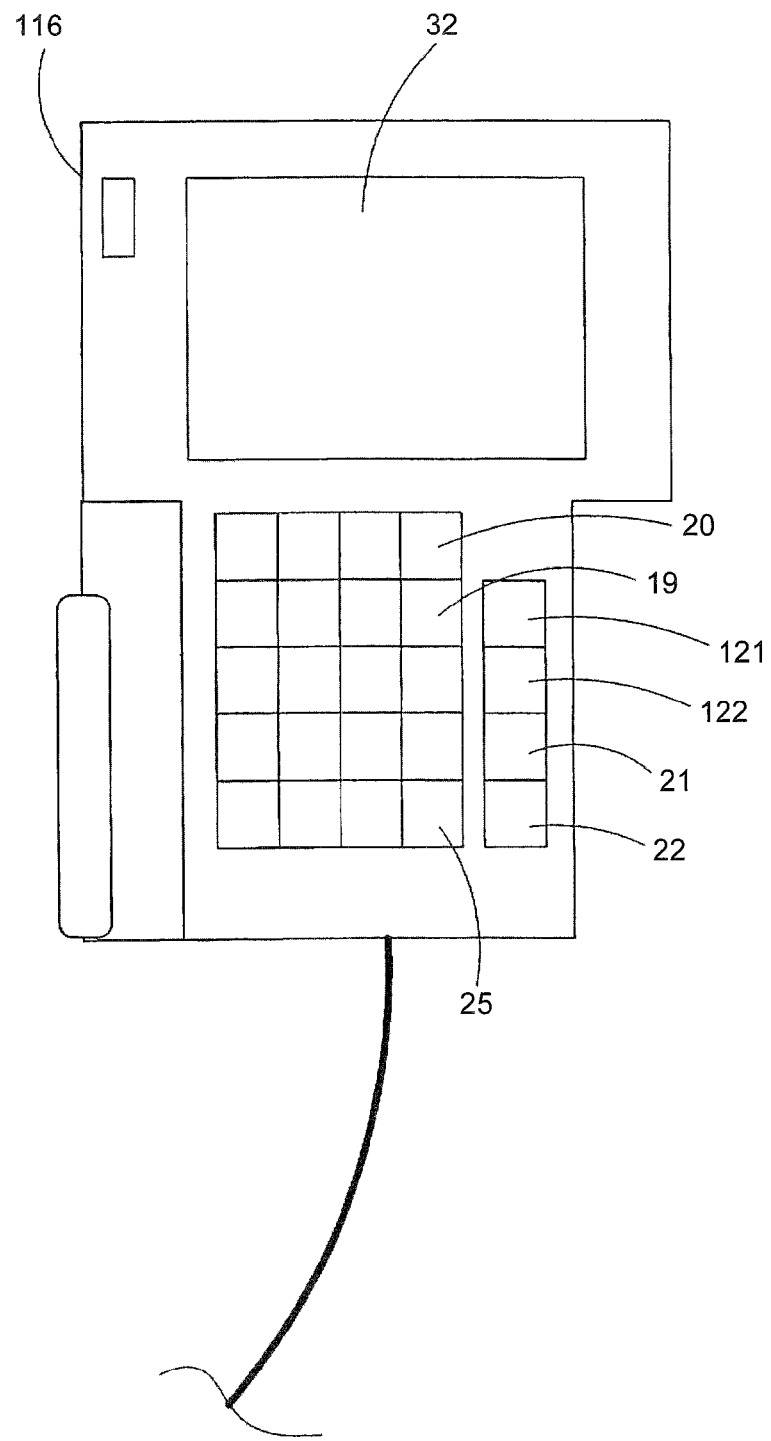
FIG. 9 is an illustration of a teaching pendant of the robot system according to a second embodiment.

A teaching pendant 116 is further provided with a second limit avoidance button 121 and a second posture optimization button 122, as illustrated in FIG. 9.

The second limit avoidance button 121 is a button for the operator to give an instruction to avoid a limit. When the second limit avoidance button 121 is pressed, the teaching pendant 116 outputs the signal A. The second limit avoidance button 121 takes alternate action. That is, once the second limit avoidance button 121 is pressed, the teaching pendant 116 outputs the signal A until the second limit avoidance button 121 is pressed again.

The second posture optimization button 122 is a button for the operator to give an instruction to optimize the posture of the robot 12. When the second posture optimization button 122 is pressed, the teaching pendant 116 outputs the signal B. The second posture optimization button 122 takes alternate action. That is, once the second posture optimization button 122 is pressed, the teaching pendant 116 outputs the signal B until the second posture optimization button 122 is pressed again.

Figure 10:
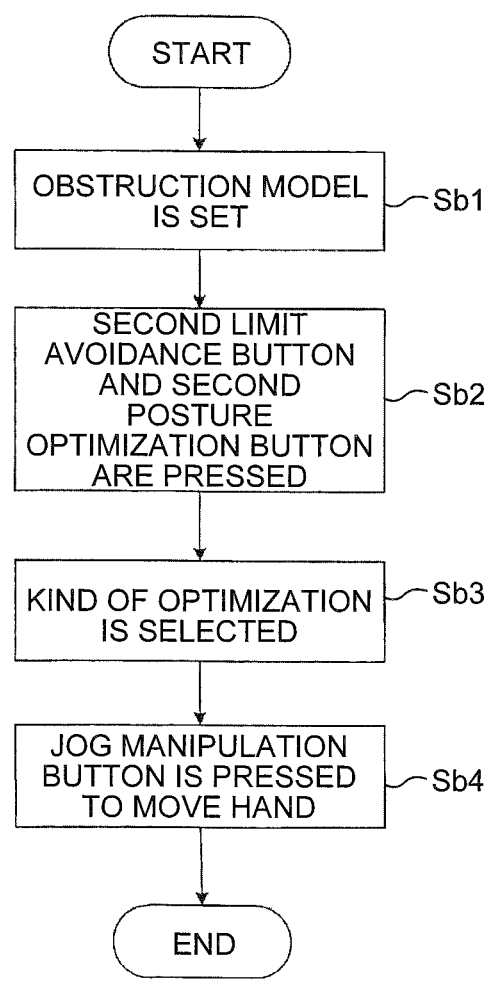
FIG. 10 is a flowchart illustrating operation of the robot system.

The operation of the robot system according to the second embodiment will now be described based on FIG. 10.

(Step Sb1)

The robot control device 14 reads model data of an obstruction and the robot 12 from CAD data of the robot 12 or an offline simulator. As a result, a model of the obstruction is set in the robot control device 14.

(Step Sb2)

The operator presses the second limit avoidance button 121 and the second posture optimization button 122 provided on the teaching pendant 116. The signal A and the signal B output from the teaching pendant 116 are input to the limit avoidance command generator 14b and the posture optimization command generator 14c, respectively, of the robot control device 14.

The limit avoidance command generator 14b and the posture optimization command generator 14c of the robot control device 14 output the joint angular speed commands $\phi_{LMT}$ and $\phi_{OPT}$, respectively.

(Step Sb3)

The operator also selects the kind of optimization (the first optimization or the second optimization). The signal $B_{SEL}$ corresponding to the kind of optimization is input to the posture optimization command generator 14c.

(Step Sb4)

In order to move the hand of the robot 12 to the desired position and posture, the operator presses the jog manipulation button 20 to jog-manipulate the robot 12. The limit avoidance operation and the posture optimization operation are then performed automatically.

The joint angular speed commands for the limit avoidance operation and the posture optimization operation are obtained by the same methods as in the processing at step Sa3 and step Sa5, respectively, as explained in the first embodiment. That is, in the present step Sb4, the joint angular speed command $\omega ref1$ for implementing the hand speed command V output by the first command generator 14a based on Equation (2) is added to the joint angular speed command ωref2 output by the second command generator 14e to generate each joint angular speed command ωref3 for robot 12. This joint angular speed command ωref2 is the sum of the joint angular speed command $\phi_{LMT}$ (see Equation (9)) for avoiding a limit with the position and posture of the hand being kept and the joint angular speed command $\omega_{OPT}$ (see Equation (17)) for optimizing a posture of the robot 12 with the position and posture of the hand being kept.

When the second limit avoidance button 121 and the second posture optimization button 122 are pressed again, the teaching pendant 116 stops output of the signal A and the signal B, so that execution of the limit avoidance operation or the posture optimization operation is cancelled.

The operator can execute only one of the limit avoidance operation and the posture optimization operation by pressing only one of the second limit avoidance button 121 and the second posture optimization button 122.

The method illustrated in the present embodiment allows the limit avoidance operation and the posture optimization operation to be performed automatically and thereby improves the manipulability of the redundant robot.

Of the first and the second limit avoidance buttons and the first and the second posture optimization buttons, only a button corresponding to the required function may be provided on the teaching pendant.

The buttons are not limited to hardware buttons. The buttons may be buttons implemented by software.

The present invention is applicable not only in a case where the actual robot is used as illustrated in the foregoing embodiments but also in a case where a simulation model of the robot is used. That is, it is also usable for checking the validity of the work program using an offline simulator.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot system comprising:
   a robot having a plurality of joint axes including a redundant axis, the joint axes being driven by a servomotor; and
   a robot control device that controls the robot,
   the robot control device comprising:
      a first command generator configured to generate a first joint angular speed command for the robot on the basis of an input speed command for a control point of the robot;
      a limit avoidance command generator configured to generate a joint angular speed command A for the robot for avoiding a state in which the robot reaches an operating limit, on the basis of an evaluation function A, while a signal A is being input;
      a posture optimization command generator configured to generate a joint angular speed command B for the robot for optimizing a posture of the robot, on the basis of an evaluation function B, while a signal B is being input,
      a null space matrix calculator configured to calculate a null space matrix of a Jacobian matrix related to the control point,
      a second command generator configured to generate a second joint angular speed command for the robot on the basis of the joint angular speed command A, the joint angular speed command B, and the null space matrix, and
      a controller configured to control the servomotor on the basis of a third joint angular speed command that is a sum of the first and second joint angular speed commands.

2. The robot system according to claim 1, wherein
the evaluation function A is calculated based on a difference between a set angle set as a movable limit angle of each joint of the robot and a current value of an angle of the joint, and
the limit avoidance command generator generates the joint angular speed command A on the basis of a gradient of the evaluation function A.

3. The robot system according to claim 1, wherein
the evaluation function A is calculated based on a difference between a set distance set as a distance by which the robot is capable of approaching an obstruction and a distance from the obstruction to the robot, and
the limit avoidance command generator generates the joint angular speed command A on the basis of a gradient of the evaluation function A.

4. The robot system according to claim 1, wherein
the evaluation function A is calculated based on manipulability of the robot, and
the limit avoidance command generator generates the joint angular speed command A on the basis of a gradient of the evaluation function A.

5. The robot system according to claim 1, wherein
the evaluation function B is calculated based on a difference between an angle of each joint at a previous teaching point of the robot and a current value of the angle of the joint, and
the posture optimization command generator generates the joint angular speed command B on the basis of a gradient of the evaluation function B.

6. The robot system according to claim 2, wherein
the evaluation function B is calculated based on a difference between an angle of each joint at a previous teaching point of the robot and a current value of the angle of the joint, and
the posture optimization command generator generates the joint angular speed command B on the basis of a gradient of the evaluation function B.

7. The robot system according to claim 3, wherein
the evaluation function B is calculated based on a difference between an angle of each joint at a previous teaching point of the robot and a current value of the angle of the joint, and
the posture optimization command generator generates the joint angular speed command B on the basis of a gradient of the evaluation function B.

8. The robot system according to claim 4, wherein
the evaluation function B is calculated based on a difference between an angle of each joint at a previous teaching point of the robot and a current value of the angle of the joint, and
the posture optimization command generator generates the joint angular speed command B on the basis of a gradient of the evaluation function B.

9. The robot system according to claim 1, wherein
the evaluation function B is calculated based on manipulability of the robot, and
the posture optimization command generator generates the joint angular speed command B on the basis of a gradient of the evaluation function B.

10. The robot system according to claim 2, wherein
the evaluation function B is calculated based on manipulability of the robot, and
the posture optimization command generator generates the joint angular speed command B on the basis of a gradient of the evaluation function B.

11. The robot system according to claim 3, wherein
the evaluation function B is calculated based on manipulability of the robot, and
the posture optimization command generator generates the joint angular speed command B on the basis of a gradient of the evaluation function B.

12. The robot system according to claim 4, wherein
the evaluation function B is calculated based on manipulability of the robot, and
the posture optimization command generator generates the joint angular speed command B on the basis of a gradient of the evaluation function B.

13. The robot system according to claim 1, further comprising:
a teaching pendant that teaches a position and posture of the robot, wherein
the teaching pendant includes a first signal output unit that outputs the signal A and a second signal output unit that outputs the signal B.

14. The robot system according to claim 13, wherein the teaching pendant further includes:
a display screen; and
a rendering unit that renders a graphics image representing a posture of the robot at present and a graphics image of the robot with the posture optimized, on the display screen.

15. A robot control device comprising:
a first command generator configured to generate a first joint angular speed command for a robot having a plurality of joint axes including a redundant axis, on the basis of a speed command for a control point of the robot;
a limit avoidance command generator configured to generate a joint angular speed command A for the robot for avoiding a state in which the robot reaches an operating limit, on the basis of an evaluation function A, while a signal A is being input;
a posture optimization command generator configured to generate a joint angular speed command B for the robot for optimizing a posture of the robot, on the basis of an evaluation function B, while a signal B is being input;
a null space matrix calculator configured to calculate a null space matrix of a Jacobian matrix related to the control point;
a second command generator configured to generate a second joint angular speed command for the robot on the basis of the joint angular speed command A, the joint angular speed command B, and the null space matrix; and
a controller configured to control a servomotor on the basis of a third joint angular speed command that is a sum of the first and second joint angular speed commands.

16. A method for controlling a robot that has a plurality of joint axes including a redundant axis that are driven by a servomotor, the method comprising:
generating a first joint angular speed command for the robot on the basis of an input speed command for a control point of the robot;
generating a joint angular speed command A for the robot for avoiding a state in which the robot reaches an operating limit, on the basis of an evaluation function A, while a signal A is being input;
generating a joint angular speed command B for the robot for optimizing a posture of the robot, on the basis of an evaluation function B, while a signal B is being input,
calculating a null space matrix of a Jacobian matrix related to the control point,
generating a second joint angular speed command for the robot on the basis of the joint angular speed command A, the joint angular speed command B, and the null space matrix, and
controlling the servomotor on the basis of a third joint angular speed command that is a sum of the first and second joint angular speed commands.

* * * * *